United States Patent Office

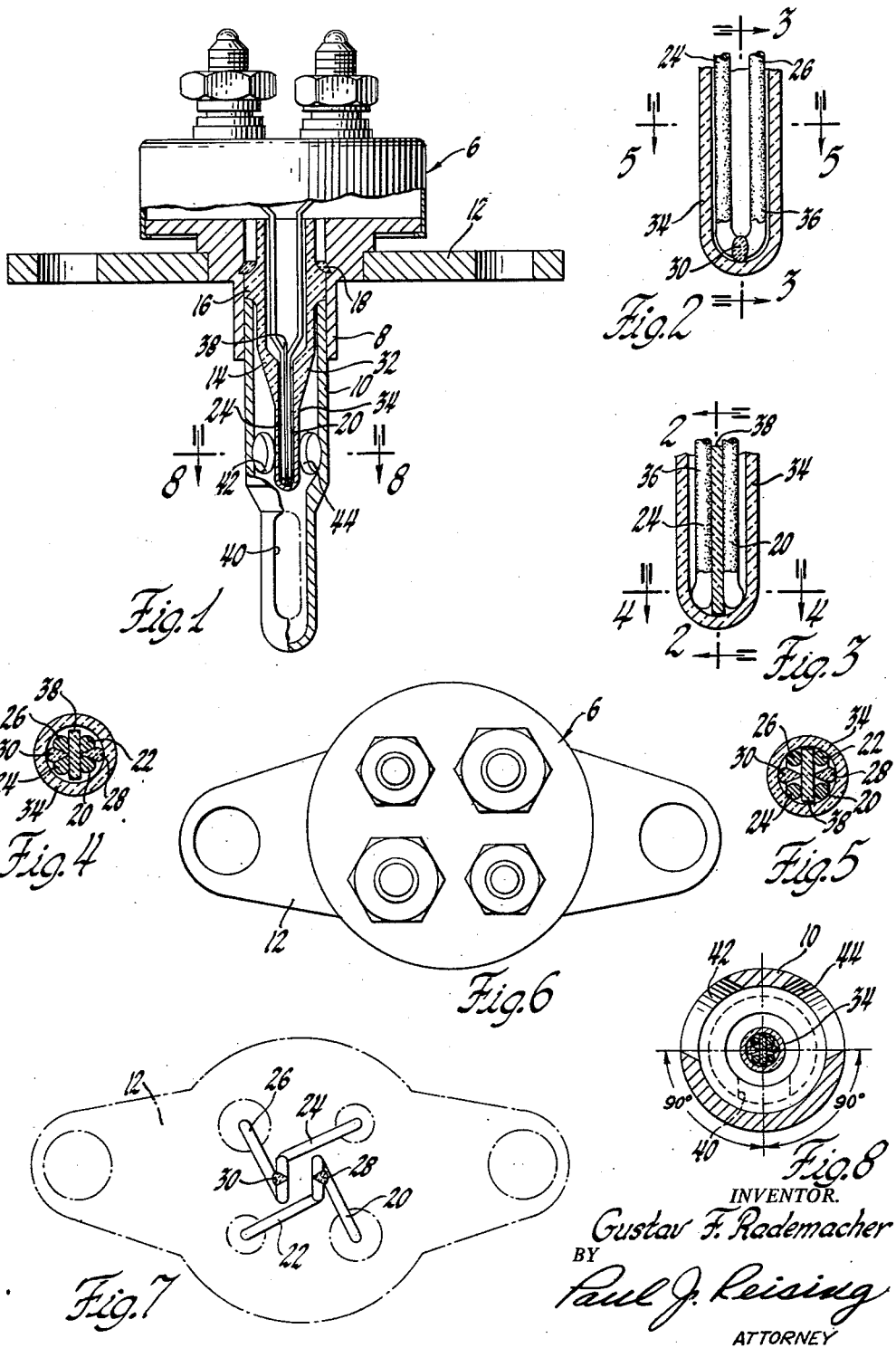

3,159,032
Patented Dec. 1, 1964

3,159,032
THERMOCOUPLE
Gustav F. Rademacher and Alfred Candelise, Flint, Mich., assignors to General Motors Corporation, Detroit, Mich., a corporation of Delaware
Filed Mar. 18, 1960, Ser. No. 16,053
12 Claims. (Cl. 73—359)

This invention relates to thermocouples of the type having a heat-sensitive junction of two dissimilar metals the E.M.F. of which is proportional to temperature, and more particularly to an improved thermocouple particularly suited for the measurement of temperatures in gas turbine engines and the like.

A thermocouple for the measurement of internal temperatures in a gas turbine engine should ideally have an extremely short response time together with high resistance to erosion from the hot exhaust gases to which the thermocouple is submitted. However, to a considerable extent these are conflicting requirements. That is, for the ultimate in attaining quick response, it is desirable that a fine wire heat-sensitive junction be directly exposed to the hot exhaust gases, whereas for the ultimate in resistance to erosion it is desirable that the heat-sensitive junction be made of thick wire and not directly exposed to the hot gases. Heretofore, a significant compromise in one or the other or both of these properties has been necessary, and since quick response is absolutely essential in order to afford the shortest time interval possible between the occurrence of a heat-producing function or malfunction and the signal indicating same, the compromise has usually been in the direction of decreasing the erosion resistance or durability of the thermocouple. Hence in currently used jet engine thermocouples the heat-sensitive junction is constructed of relatively thin wires and is directly exposed to the exhaust gases with a resultant relatively short thermocouple life.

One possible solution to this problem which has been suggested is to coat the otherwise exposed portions of the thermocouple wires and junction with a heat-resistant vitreous material so as to decrease the amount of erosion without significantly increasing the response time as disclosed in United States Patent 2,870,233, issued to Richard L. Comer on January 20, 1959. Such structure does in fact succeed in increasing the erosion resistance, however not as much so as is needed in order to attain a really outstanding increase in thermocouple life. After a period of time the thin coating is itself eroded or cracks away, particularly since the coating compositions which provide the most durable bond with the thermocouple wires are not such as to have outstanding heat and corrosion resistance. Another possible solution is to enclose the thermocouple wires and junction within a protective ceramic tube such as has been utilized in thermocouples designed for use in the metallurgical field to measure the temperature of molten metals and the like. This has heretofore never been practical for jet engines thermocouples because of the resultant slow response rate; metallurgical thermocouples require on the order of ten minutes or more to approach a true reading and this is many orders of magnitude slower than the two-to-three-second speed of response needed for most jet engine thermocouples. However, I have now discovered that the use of a protective ceramic sheath need not cause a considerable increase in response time; that if the structure of the ceramic sheath in combination with the structure of other elements of the thermocouple takes the form as hereinafter described, a tremendous increase in durability can be attained and yet with only a very small increase in response time.

Accordingly, it is an object of the present invention to provide an improved thermocouple which is characterized by a long useful life and which in addition provides a short response time.

Another object is the provision in a thermocouple of the type described which has its thermocouple wires and heat-sensitive junction protected by a thin ceramic sheath and yet provides a fast response.

Still another object of the invention is the provision of a thermocouple of the type described wherein the thermocouple wires and junction are protected by a thin ceramic sheath of such form that it affords a fast response and which additionally incorporates means to direct the hot gases against the ceramic sheath in such manner as to further increase the response rate.

These and other objects and advantages of the invention will appear more clearly from the following detailed description of a preferred embodiment thereof made with reference to the appended drawings in which:

FIGURE 1 is a side view in partial section of a thermocouple constructed in accordance with the invention;

FIGURES 2, 3, 4 and 5 are sectional views of the heat-sensitive junction portion of the thermocouple shown in FIGURE 1 but in larger scale;

FIGURE 6 is a top view of the thermocouple shown in FIGURE 1;

FIGURE 7 is a bottom view, but with parts removed, of the thermocouple shown in FIGURE 1 and shows the arrangement of the thermocouple wires; and FIGURE 8 is a view taken on the line 8—8 of FIGURE 1 and shows the arrangement of gas inlet and outlet openings in the metal shell.

Referring now in particular to FIGURE 1, the thermocouple shown comprises a metal shell composed of an upper cylindrical portion 6 of large diameter, an intermediate portion 8 secured to the large upper portion, and a lower tubular portion 10 which is welded to the lower end of the intermediate portion 8. A suitable mounting pad 12 is provided for securement of the thermocouple into the combustion chamber wall of a gas turbine engine. A generally tubular shaped ceramic sheath 14, having structure hereinafter described in detail, is secured within the metal shell by means of an external annular shoulder 16; the lower surface of the shoulder abuts the top edge of the shell portion 10 and the sheath is locked into place by a metal ring 18 which is press-fitted between the upper surfaces of the shoulder and the metal shell. Two sets of thin thermocouple wires 20 and 22 and 24 and 26, respectively, having lower ends joined to form the two heat-sensitive junctions 28 and 30, are positioned in the ceramic sheath with the heat-sensitive junctions abutting the bottom wall thereof, this as best shown in FIGURE 2. The sets of wires may be of any suitable dissimilar metals; for example, one wire of each set can be of Chromel (90% nickel and 10% chromium) and the other of Alumel (95% nickel and the remainder aluminum, silicon and manganese), as well known in the art. Each of the thermocouple wires has its own terminal to which it is electrically connected at the top of the shell 6, the two terminals for one set of thermocouple wires being provided with smaller hex nuts than those of the terminals for the other set of thermocouple wires for purposes of easy identification of terminals during installation. The incorporation of two junctions instead of only one adds reliability to the device, i.e., it will continue to function even if one junction should fail. This feature is advantageous particularly for aircraft engine usage in order to provide an extra margin of safety.

To afford optimum protection against thermocouple wire movement and possible breakage from vibration, it is desirable that the entire space in the upper end of the ceramic sheath and in the shell portion 6 be filled with a suitable ceramic cement or potting compound, one suitable composition for such a filler being that disclosed in United States Patent 2,888,508, issued to Gustav F. Rademacher on May 26, 1959. The precise structure of the upper portion 6 of the metal shell and the manner in which the electrical terminals are secured thereto forms no part of the present invention and such structure may, if desired, be that shown in the aforesaid patent to Rademacher.

Referring again now to FIGURE 1, the ceramic sheath 14 has an upper portion adjacent the shoulder 16 which is of large internal and external diameter, an intermediate tapered portion 32, and a lower portion 34 of small internal and external diameter. The internal diameter of the lower portion 34 is such that the two sets of thermocouple wires fit very snugly therein and in order to assure against short-circuiting, each of the wires is provided with a thin coating 36 of a suitable insulating enamel, this coating extending from immediately adjacent the heat-sensitive junction to at least the top of the small internal diametered portion of the sheath, at which point the wires can be bent outwardly and hence spatially separated from each other to a greater extent as shown in FIGURE 1. The coating compositions disclosed in the aforesaid patent to Richard L. Comer can be used satisfactorily as the thin covering 36 for the thermocouple wires. Further, to assure physical separation and electrical insulation of one set of thermocouple wires from the other, a thin elongated sheet of mica 38 is positioned between the sets of wires, this as best shown in FIGURE 3. It is desirable that the lower ends of the thermocouple wires and the heat-sensitive junctions fit snugly against the ceramic sheath, and to this end there should be the snuggest fit possible between all the elements in the lower end of the sheath commensurate with attaining the necessary electrical insulation between the wires and junctions. Accordingly it is preferable that at each heat-sensitive junction the weld bead which will normally be formed when the two thermocouple wires are bonded together, be slightly abraded away on that side which faces the other weld bead so that the two junctions present a slightly flattened surface to each other, thereby allowing just enough clearance to assure physical and electrical separation. However, the opposite side of each heat-sensitive junction weld bead is left rounded so that it makes maximum contact with the ceramic sheath. This is shown in FIGURES 3, 4 and 5, the weld bead of each of heat-sensitive junctions 28 and 30 having its normal bulge on the side thereof disposed against the ceramic sheath but being flat on the side thereof adjacent the weld bead of the other heat-sensitive junction.

It will be noted that the lower sheath portion 34 is spaced considerably from the metal shell and that the only portion of the sheath in pressed contact with the shell is the shoulder 16. Hence, substantially all heat conduction away from the lower end of the sheath is through the securing shoulder 16.

In order to attain accurate response and a good response rate, it is important not only that the mass of ceramic around the heat-sensitive junctions be small but that the rate of heat conduction to the metal shell through the ceramic sheath and away from the lower tip thereof be very low. To this end the wall thickness of the ceramic sheath adjacent the heat-sensitive junctions at the lower end thereof preferably should not exceed about .04 inch nor be greater than one-twentieth ($\frac{1}{20}$) the distance from the lower end of the sheath to the shell-contacting shoulder 16. Further, to attain optimum physical strength and shock resistance commensurate with essential thermal characteristics, it is highly desirable that the shape of the sheath be as shown, with a lower thin-walled portion 34 communicating with an enlarged upper portion, and that the length of the thin-walled lower portion 34 be at least ten times greater than the thickness of the ceramic wall of this lower portion. In the particular embodiment shown the dimensions are approximately as follows:

| | Inch |
|---|---|
| Diameter of each thermocouple wire | .02 |
| External diameter of lower portion of sheath | .1 |
| Internal diameter of lower portion of sheath | .06 |
| Wall thickness of lower portion of sheath | .02 |
| Length of lower portion of sheath (i.e., the length L) | .4 |
| Distance from lower end of sheath to the shell-contacting shoulder 16 | .8 |

Hence in this embodiment the length of the thin-walled portion is approximately twenty times its wall thickness and the distance between the shoulder 16 to the lower end of the sheath is about forty times this wall thickness. With this construction there is substantially no loss of heat from the tip by conduction through the sheath and the temperature reading obtained from the tip will be a true reading of the gas temperature. In some instances, for example, where it is necessary that the thermocouple have performance characteristics which are specified for a particular jet engine instrumentation system, it may be required to build some heat conduction loss into the thermocouple in order to accomplish a specified differential between actual gas temperature and thermocouple response to same. This can be accomplished by forming the sheath such that the large-diametered upper portion extends further down toward the sheath tip, either the tapered portion 32 or the lower thin-walled portion 34 being made somewhat shorter. To best accomplish heat conduction loss in this manner, the clearance between the large-diametered sheath portion and the metal shell adjacent same should be reduced, preferably to .003 inch or less. It will be understood that by building heat conduction loss into the device, one actually sacrifices to some degree the outstanding performance characteristics of the thermocouple; however, it is mentioned to illustrate that thermocouples constructed in accordance with the invention may be made to meet the requirements of various existing thermocouple instrumentation systems designed to compensate for the less perfect performance of existing types of thermocouple devices.

For strength, mechanical and thermal shock resistance and other important properties, the sheath should preferably be made of a high alumina composition containing upwards of 85% aluminum oxide; the ceramics covered by United States Patent 2,760,875, issued to Karl Schwartzwalder and Helen Blair Barlett on August 28, 1956, serve eminently well. Also, sintered beryllium oxide is excellent as a ceramic for the sheath.

And now further with respect to the metal shell, it will be noted in FIGURE 1 that shell portion 10 forms a housing around the heat-sensitive end of the sheath-thermocouple wire assembly and has a lower cylindrical section of relatively small diameter with an elongated gas inlet opening 40, an intermediate tapered portion, and an upper cylindrical portion of large diameter with two gas outlet openings 42 and 44 each having its center oriented at approximately 120° from the center of the inlet opening (see FIGURE 8) and having a combined area which slightly exceeds that of the inlet opening. The thermocouple is mounted in the gas turbine engine such that the inlet opening faces into the stream of gas and the outlets face generally laterally and rearwardly. Hence, when mounted, the plane of the inlet opening is disposed approximately perpendicular to the axis of the gas stream and the plane of each outlet opening is disposed at an angle to said axis, the leading or upstream edge of each outlet opening being located at that point on the portion of the housing in which it is located, which is of maximum lateral displacement from the center of the housing. Where the housing is cylindrical, as shown, this means that the leading edge of each outlet opening is located on the center line of the housing which is perpendicular to the direction of flow with the center of the inlet opening being oriented at 90° from the leading edges of the outlets.

With this construction, the force of the gas stream rams a sample stream of gas into the inlet opening, and the gas stream passing around the exterior of the housing creates a low pressure at the outlet openings such that there is a suction effect thereby greatly increasing the mass flow rate of the gas through the housing and commensurately increasing the speed of response of the thermocouple to any change in gas temperature. I have found that this shell structure, which is disclosed and claimed in my United States Patent 3,075,387 issued Jan. 29, 1963, is especially advantageous when used in combination with the ceramic sheath-thermocouple wire assembly described herein. At the cost of but a very small increase in response time, the ceramic sheath affords excellent erosion resistance which is fully ample to withstand the slightly increased erosion which would otherwise be caused by the increased mass flow rate resulting from the arrangement of inlets and outlets, and the latter feature decreases the response time sufficiently to fully compensate for the small increase in response time caused by the sheath. Hence, the features complement each other with the result that a thermocouple utilizing the combination will have erosion resistance and durability greatly exceeding thermocouples of the type presently being used while at the same time providing a response rate which is at least as fast as those of presently used thermocouples. It will be understood, of course, that particularly where a minimum response time is not required, housings with gas porting arrangements other than that described may be used, or the heat-sensitive lower end of the ceramic sheath-thermocouple wire assembly may be directly exposed to the stream of hot gas to be measured without any surrounding housing.

Where the preferred gas porting arrangement as described above is used, it is desirable that the tip portion of the ceramic sheath which contains the heat-sensitive junctions be positioned in the tapered shell section adjacent the small diameter portion, as shown, such that the annular clearance between the shell and the ceramic is restricted at this point. This arrangement is advantageous because at high engine speeds when the rate of gas flow through the thermocouple might otherwise reach supersonic speeds and be even higher than required for adequately fast response, the restricted clearance between the sheath and shell tends to slightly reduce the rate of flow against the sheath. This prevents sheath wear and also precludes false temperature readings that might otherwise result by way of the effect of the speed itself of a supersonic speed gas stream on the sheath tip. At low engine speeds when the mass flow rate through the thermocouple is not so great, the annular opening between the sheath and the shell is ample to allow free flow of gas without any blocking effect.

It will be understood that while the invention has been described in detail specifically with reference to a preferred embodiment thereof, changes and modifications may be made, all within the full and intended scope of the claims which follow.

We claim:

1. A thermocouple for measuring the temperature of a moving stream of gas comprising a metal shell, an elongated generally tubular shaped ceramic sheath within and surrounded by said shell, said ceramic sheath having a thin closed lower end in spaced relationship to said shell and a thick shoulder portion spaced from said lower end in pressed contact with said metal shell, a pair of thermocouple wires extending into said sheath and joined together to form a heat-sensitive junction at the closed end of said sheath, the thickness of the wall of said ceramic sheath at the closed end thereof adjacent said heat-sensitive junction not exceeding .04 inch and not exceeding $\frac{1}{20}$ the distance from the closed end of said sheath to said portion in contact with said shell, the lower end of said shell having gas inlet and outlet openings therein to direct a portion of the moving stream of gas against the closed lower end of said sheath.

2. A thermocouple for measuring the temperature of a moving stream of gas comprising a metal shell, an elongated generally tubular shaped ceramic sheath in said shell, said ceramic sheath having a thin closed lower end in spaced relationship to said shell and a thick shoulder portion spaced from said lower end in pressed contact with said metal shell, a pair of thermocouple wires extending into said sheath and joined together to form a heat-sensitive junction at the closed end of said sheath, the thickness of the wall of said ceramic sheath at the closed end thereof adjacent said heat-sensitive junction not exceeding .04 inch and not exceeding $\frac{1}{20}$ the distance from the closed end of said sheath to said portion in contact with said shell, and means in said shell responsive to the movement of the stream of gas for increasing the mass flow rate of the gas adjacent the closed end of said sheath.

3. A thermocouple for measuring the temperature of a moving stream of gas comprising a metal shell, an elongated generally tubular shaped ceramic sheath in said shell, said ceramic sheath having a thin closed lower end in spaced relationship to said shell and a thick shoulder portion spaced from said lower end in pressed contact with said metal shell, two pairs of thermocouple wires extending into said sheath and joined together so as to form two heat-sensitive junctions at the closed end of said sheath, electrical insulating means in said sheath separating said pairs of wires and separating said junctions, the thickness of the wall of said ceramic sheath at the closed end thereof adjacent said heat-sensitive junction not exceeding .04 inch and not exceeding $\frac{1}{20}$ the distance from the closed end of said sheath to said portion in contact with said shell, and means in said shell responsive to the movement of the stream of gas for increasing the mass flow rate of the gas adjacent the closed end of said sheath.

4. A thermocouple as set forth in claim 3 wherein each of said heat-sensitive junctions is substantially flat on the side thereof facing the other of said junctions and is rounded and in contact with the ceramic sheath on the oppositely disposed side thereof.

5. A thermocouple for measuring the temperature of a moving stream of gas comprising a tubular generally cylindrical shaped metal shell, said shell having a lower end portion of relatively small diameter with a fluid inlet opening therein, a tapered portion immediately above said lower end portion and a portion of enlarged diameter immediately above the tapered portion with a fluid outlet opening therein, the center of said outlet opening being oriented at about 120° to the center of said inlet opening, an elongated generally tubular shaped ceramic sheath in said shell, said ceramic sheath having a closed lower end in spaced relationship to said shell terminating adjacent the tapered portion thereof and a portion spaced from said lower end in pressed contact with said metal shell, the thickness of the wall of said ceramic sheath at the closed end thereof not exceeding .04 inch and not exceeding $\frac{1}{20}$ the distance from the closed end of said sheath to said portion in contact with said shell, and a pair of thermocouple wires extending into said sheath and joined together so as to form a heat-sensitive junction at the closed end of said sheath.

6. A thermocouple for measuring the temperature of a moving stream of gas comprising a metal shell, an elongated generally tubular shaped ceramic sheath within and surrounded by said shell, said ceramic sheath having an upper end of relatively large diameter with a shoulder portion in pressed securing contact with said shell and having an elongated lower end portion of relatively small diameter closed at the bottom thereof and in spaced relationship to said shell, a pair of thermocouple wires extending into said sheath and joined together to form a heat-sensitive junction at the bottom of said sheath, the elongated lower end portion of said sheath having a wall thickness less than .04 inch and less than $\frac{1}{10}$ the length thereof and also less than $\frac{1}{20}$ the distance from the bottom of said sheath to said portion in contact with said shell, the lower end of said shell having gas inlet and outlet openings therein to direct a portion of the moving stream of gas against the closed lower end of said sheath.

7. A thermocouple for measuring the temperature of a moving stream of gas comprising a metal shell, an elongated generally tubular shaped ceramic sheath with and surrounded by said shell, said ceramic sheath having an upper end of relatively large diameter with an external annular shoulder in pressed securing contact with said shell and having an elongated lower end portion of relatively small diameter closed at the bottom thereof and in spaced relationship to said shell, two pairs of thermocouple wires extending into said sheath and joined together so as to form two heat-sensitive junctions at the closed end of said sheath, electrical insulating material in said sheath separating said pairs of wires and separating said junctions, the elongated lower end portion of said sheath having a wall thickness less than .04 inch and less than $\frac{1}{10}$ the length thereof and also less than $\frac{1}{20}$ the distance from the bottom of said sheath to said shoulder, the lower end of said shell having gas inlet and outlet openings therein to direct a portion of the moving stream of gas against the closed lower end of said sheath.

8. A thermocouple for measuring the temperature of a stream of gas comprising a metal shell, an elongated generally tubular shaped ceramic sheath in said shell, said ceramic sheath having a thin closed lower end in spaced relationship to said shell and a thick shoulder portion spaced from said lower end in contact with said metal shell, and a pair of thermocouple wires extending into said sheath and joined together so as to form a heat-sensitive junction at the closed end of said sheath, the thickness of the wall of said sheath at the closed end thereof adjacent said heat-sensitive junction not exceeding about $\frac{1}{20}$ the distance from the closed end of said sheath to said portion in contact with said shell, the lower end of said shell being formed as a housing surrounding the lower end of said ceramic sheath and having gas inlet and outlet openings therein, said inlet and outlet openings being arranged to direct a sample portion of said stream of gas through said housing and to increase the mass flow rate per unit cross-section area of said sample portion above that of the portions of the gas stream passing around the housing.

9. A thermocouple for measuring the temperature of a stream of gas comprising a metal shell, an elongated generally tubular shaped ceramic sheath in said shell, said ceramic sheath having a thin closed lower end in spaced relationship to said shell and a thick shoulder portion spaced from said lower end in contact with said metal shell, and a pair of thermocouple wires extending into said sheath and joined together so as to form a heat-sensitive junction at the closed end of said sheath, the thickness of the wall of said sheath at the closed end thereof adjacent said heat-sensitive junction not exceeding about $\frac{1}{20}$ the distance from the closed end of said sheath to said portion in contact with said shell, the lower end of said shell being formed as a housing surrounding the lower end of said ceramic sheath, said housing having at least one gas inlet opening arranged to face directly into said gas stream such that a sample portion of the stream enters said inlet and at least one outlet opening facing laterally and rearwardly of said inlet opening such that the portions of the gas stream passing around said housing create a suction effect at said outlet opening thereby increasing the mass flow rate of gas through said housing.

10. A thermocouple for measuring the temperature of a stream of gas comprising a metal shell, an elongated generally tubular shaped ceramic sheath in said shell, said ceramic sheath having an upper end of relatively large diameter with a portion in pressed securing contact with said shell and having an elongated lower end portion of relatively small diameter closed at the bottom thereof and in spaced relationship to said shell and a pair of thermocouple wires extending into said sheath and joined together to form a heat-sensitive junction at the bottom of said sheath, the elongated lower end portion of said sheath having a wall thickness less than .04 inch and less than $\frac{1}{10}$ the length thereof and also less than $\frac{1}{20}$ the distance from the bottom of said sheath to said portion in contact with said shell, the lower end of said shell being formed as a cylindrical housing surrounding the lower end portion of said ceramic sheath, said housing having at least one gas inlet opening arranged to face directly into said gas stream such that a sample portion of the stream enters said inlet opening and a pair of outlet openings located above said inlet opening and facing laterally and rearwardly of said inlet opening such that the portions of the gas stream passing around said housing create a suction effect at said outlet openings thereby increasing the mass flow rate of gas through said housing.

11. A thermocouple for measuring the temperature of a stream of gas comprising a metal shell, an elongated generally tubular shaped ceramic sheath in said shell, said ceramic sheath having a thin closed lower end in spaced relationship to said shell and a thick shoulder portion spaced from said lower end in contact with said metal shell, and a pair of thermocouple wires extending into said sheath and joined together so as to form a heat-sensitive junction at the closed end of said sheath, the thickness of the wall of said sheath at the closed end thereof adjacent said heat-sensitive junction not exceeding about $\frac{1}{20}$ the distance from the closed end of said sheath to said portion in contact with said shell, the lower end of said shell being formed as a housing surrounding the lower end of said ceramic sheath, said housing having a lower portion of relatively small cross sectional area with at least one inlet opening therein and having an upper portion of relatively large cross sectional area with at least one outlet opening therein, the lower end of said ceramic sheath being positioned at the junction of said lower and upper housing portions, said inlet opening being arranged to face into said gas stream with its plane approximately perpendicular to the axis of the gas stream and said outlet opening being arranged to face generally laterally and rearwardly of said inlet opening with its leading edge at that point on the wall of the upper portion of said housing which is of maximum lateral displacement from the longitudinal axis of the housing.

12. A thermocouple for measuring the temperature of a stream of gas comprising a metal shell, an elongated generally tubular shaped ceramic sheath in said shell, said ceramic sheath having a thin closed lower end in spaced relationship to said shell and a thick shoulder portion spaced from said lower end in contact with said metal shell, and a pair of thermocouple wires extending into said sheath and joined together so as to form a heat-sensitive junction at the closed end of said sheath, the thickness of the wall of said sheath at the closed end thereof adjacent said heat-sensitive junction not exceeding about $\frac{1}{20}$ the distance from the closed end of said sheath to said portion in contact with said shell, the lower end of said shell being formed as a cylindrical housing surrounding the lower end of said ceramic sheath, said housing having an inlet opening and two outlet openings axially spaced from said inlet opening, the lower end of said ceramic sheath being positioned between said inlet and said outlet openings, said inlet opening being arranged to face into said gas stream with its plane approximately perpendicular to the axis of the gas stream and the leading edge of each of said outlet openings being oriented at about 90° from the center of said inlet opening.

References Cited in the file of this patent

UNITED STATES PATENTS

| | | |
|---|---|---|
| 1,660,504 | Grubb | Feb. 28, 1928 |
| 2,012,112 | States | Aug. 20, 1935 |
| 2,870,233 | Comer | Jan. 20, 1959 |

FOREIGN PATENTS

| | | |
|---|---|---|
| 127,534 | Great Britain | June 5, 1919 |
| 734,702 | Great Britain | Aug. 3, 1955 |
| 784,597 | Great Britain | Oct. 9, 1957 |

---

UNITED STATES PATENT OFFICE

CERTIFICATE OF CORRECTION

Patent No. 3,159,032                        December 1, 1964

Gustav F. Rademacher et al.

It is hereby certified that error appears in the above numbered patent requiring correction and that the said Letters Patent should read as corrected below.

Column 1, line 57, for "engines" read -- engine --; column 2, line 51, for "surfaces" read -- surface --; column 7, line 21, for "with" read -- within --; line 58, for "cross-section" read -- cross-sectional --.

Signed and sealed this 27th day of April 1965.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,159,032            December 1, 1964

Gustav F. Rademacher et al.

It is hereby certified that error appears in the above numbered patent requiring correction and that the said Letters Patent should read as corrected below.

Column 1, line 57, for "engines" read -- engine --; column 2, line 51, for "surfaces" read -- surface --; column 7, line 21, for "with" read -- within --; line 58, for "cross-section" read -- cross-sectional --.

Signed and sealed this 27th day of April 1965.

(SEAL)
Attest:

ERNEST W. SWIDER
Attesting Officer

EDWARD J. BRENNER
Commissioner of Patents